May 20, 1958

E. T. ARMSTRONG ET AL  
BRAKE CONSTRUCTION HAVING MINIMIZED TENDENCY TO VIBRATE 2,835,351

Filed Sept. 14, 1955

INVENTOR.  
EDWARD T. ARMSTRONG  
BY FRANK H. HIGHLEY

*P. L. Miller*  
ATTORNEY

May 20, 1958

E. T. ARMSTRONG ET AL
BRAKE CONSTRUCTION HAVING MINIMIZED
TENDENCY TO VIBRATE 2,835,351

Filed Sept. 14, 1955

INVENTOR.
EDWARD T. ARMSTRONG
BY FRANK H. HIGHLEY

R. L. Miller
ATTORNEY

United States Patent Office 2,835,351
Patented May 20, 1958

2,835,351

BRAKE CONSTRUCTION HAVING MINIMIZED TENDENCY TO VIBRATE

Edward T. Armstrong, Butler, N. J., and Frank H. Highley, Canton, Ohio, assignors to The Goodyear Tire & Rubber Company, Akron, Ohio, a corporation of Ohio Application September 14, 1955, Serial No. 534,359

2 Claims. (Cl. 188—73)

This invention in general relates to brakes, more especially to brakes having a minimized tendency to excite vibrations in and from the brake when operated.

In brakes made and used in the past, many different constructions have been proposed but all of such constructions, insofar as we are aware, have had a tendency to vibrate when actuated. These vibrations produced in the brake in turn excite vibrations that are transmitted throughout the structure of the article to which the brake is secured, and in some insances large amplitude vibrations are produced in the support structure. Such vibrations of course vary appreciably at different speeds of the aircraft and the vibrations have different frequencies in some cases dependent upon the operational conditions in the brake.

It is the general object of the present invention to provide a novel and improved brake construction characterized by a minimized tendency to vibrate when actuated.

Another object of the invention is to provide a brake configuration wherein a plurality of spot type braking units are provided and are symmetrically disposed about the brake disc surface.

Another object of the invention is to provide an improved, reinforced brake disc for use in brakes, wherein such brake disc has reinforced radially outer and/or radially inner edge portions for reinforcing the brake disc against deflection and/or vibration.

Yet a further object of the invention is to correlate the number of key receiving slots provided in the peripheral portion of a brake disc for securing the disc to a wheel with the number of spot type braking units provided in a brake.

Another object of the invention is to provide a brake wherein an odd number of braking units are provided and where the number of key slots provided is larger than the number of braking units but is not divisible equally by such number of braking units.

The foregoing and other objects and advantages of the invention will be made more apparent as the specification proceeds.

For a better understanding of the invention, reference should be had to the accompanying drawings, wherein.

When referring to corresponding parts shown in the drawings and described in the specification, corresponding numerals are used to facilitate comparison between such parts.

Figure 1:
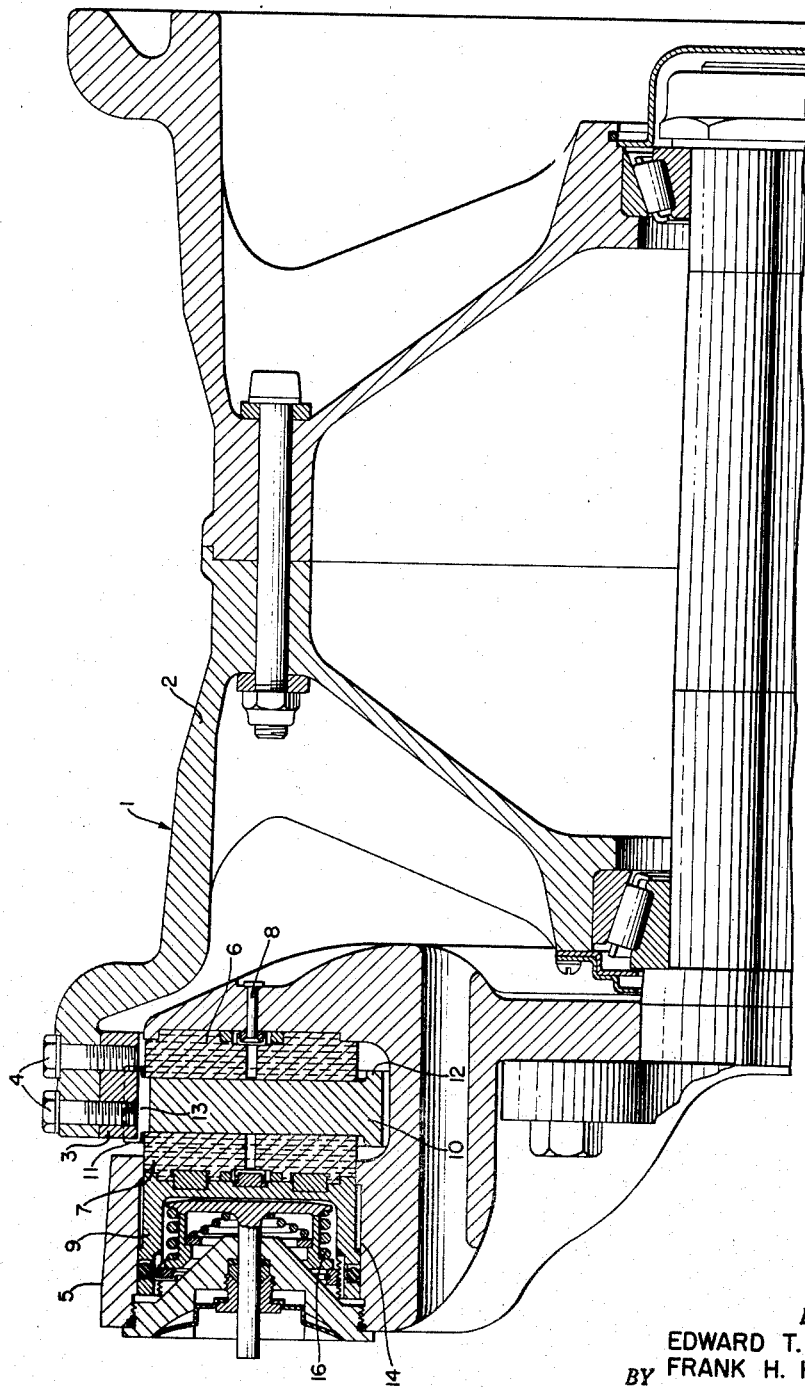
Fig. 1 is a fragmentary vertical section through a wheel and brake construction embodying the principles of the invention.

The present invention relates to a brake comprising a rotatable brake disc having a plurality of key receiving slots in the periphery thereof for driving it from a rotatable wheel means, a plurality of braking units each unit preferably comprising a pair of opposed shoes between which the rotatable disc is supported for rotation, the braking units being uniformly circumferentially spaced about the brake disc, and means for forcing the shoes against the brake disc, an odd number of braking units, but more than one, being present in the brake, the brake disc having a number of key receiving slots therein greater than the number of braking units but not evenly divisible by such number of braking units, and the brake disc preferably having a thicker radially outer and/or inner edge section than the remainder of the brake disc.

Attention now is directed to the accompanying drawings which illustrate in detail a wheel and brake construction indicated as a whole by the numeral 1. The combination includes a wheel 2 of conventional construction which wheel is provided with a plurality of circumferentially evenly spaced keys 3 secured by cap screws 4 to one marginal portion of the wheel 2, as is conventional in aircraft wheel and brake assemblies.

The wheel and brake assembly 1 includes a brake housing 5 that positions a plurality of conventional spot type brake lining units, each including a pair of opposed shoes 6 and 7 therein. These brake lining shoes 6 and 7 are secured in position in a conventional manner with the brake lining shoe 6 being secured fixedly to a portion of the housing as by a retainer pin 8. The brake lining shoe 7 is suitably secured to a brake piston 9 for movement in an axial direction in the wheel and brake assembly, as in accordance with conventional practice, for braking action. Of course, the brake lining shoes 6 and 7 are maintained in aligned opposed relation.

A brake disc 10 is positioned intermediate the brake lining discs 6 and 7 with such brake disc 10 being made from conventional metallic material but having reinforced peripheral edge portions 11 and 12 for preventing undesirable vibrations from being set up in the brake disc. Hence the brake disc 10 preferably is of substantially I-shape in cross section, as indicated in the drawings, and with the reinforced edges 11 and 12 of the brake disc being positioned radially outwardly, and radially inwardly, respectively, with relation to the brake lining shoes 6 and 7. The radially outer edge 11 of the brake disc 10 is provided with a plurality of key receiving or engaging slots 13 therein. These key slots 13 engage with the keys 3, shown in Fig. 1, so that the brake disc 10 is adapted to rotate with the wheel 2 but is movable in an axial direction with relation thereto as braking stresses are exerted thereon.

The brake piston 9 is received in a conventional braking cylinder 14 provided in the housing 5 and hydraulic brake actuating pressure fluid is supplied thereto by a suitable conduit 15 that connects to a conventional brake actuation member, such as the master cylinder of a brake system. Such hydraulic fluid obviously will cause the brake piston 9 and associated braking means to move axially towards the brake disc 10 for the desired braking action. A conventional return spring 16 is provided in association with the brake piston 9 for returning it to inoperative position when the actuation force is removed therefrom.

Figure 2:
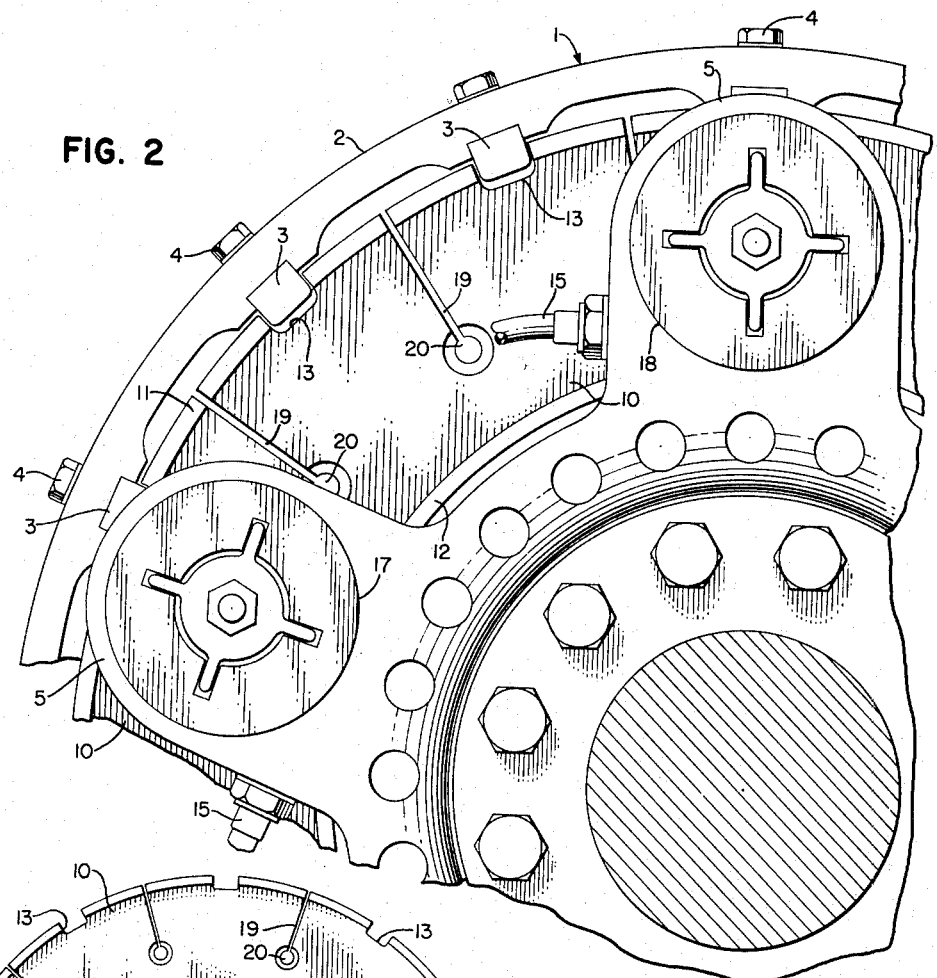
Fig. 2 is a fragmentary side elevation of the wheel and brake means shown in Fig. 1.
Figure 3:
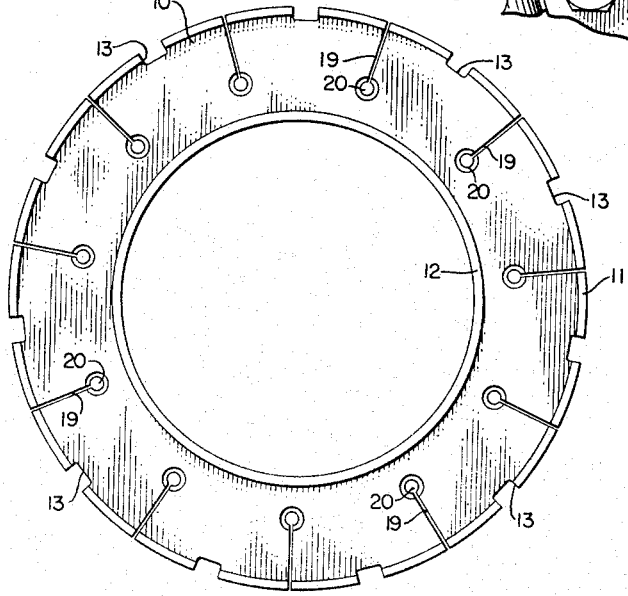
Fig. 3 is an elevation of the brake disc of the brake shown in Figs. 1 and 2.

Fig. 2 of the drawings best indicates that a plurality of the braking units indicated as a whole by the numerals 17 and 18 and including a pair of opposed brake lining shoes 6 and 7, a brake piston, etc., and in this instance five such units, are provided at equally spaced circumferential portions of the brake housing. One of the important features of the present invention is that a plurality of the braking units, evenly spaced about the brake disc are provided in the brake assembly and that an odd number of the braking units are provided. Then as a further, and correlated, feature of the invention, the number of key engaging slots 13 provided in the brake disc 10 is greater than the number of braking units, but with such number of key slots not being equally divisible by the number of braking units provided in the wheel and brake assembly of the invention, and with an odd number of such key slots being provided. Such a specific correlation between the number of braking units, the number of key slots in the brake construction, and the reinforced construction of the brake disc 10 all combine to produce a wheel and brake assembly 1 which has a minimized tendency to vibrate when actuated, regardless of the speed of the rotating wheel, or of the frequency applied to the wheel and brake assembly, or set up therein.

The brake disc 10 also is shown with stress relieving slots 19 extending radially inwardly from the periphery thereof. These slots 19 are present in an even multiple of the key slots 13, in this instance the same number of slots. The slots 19 may extend radially outwardly from the inner surface of the apertured brake disc 10, if desired. The slots 19 terminate in transversely directed holes 20 that are countersunk at each end thereof.

It will be realized that in some instances the brake disc 10 may have only a reinforced peripheral outer edge, or possibly only a reinforced inner edge, but preferably a balanced construction such as shown herein is provided.

In most wheel and brake assemblies, it is desirable that the number of braking units provided therein would be not less than 3 nor more than 7 although the invention contemplates the use of any odd number of such braking units.

In view of the foregoing, it is submitted that a novel and improved type of a brake has been provided, which brake has a minimized tendency to vibrate and cause any vibrations to be set up in the means supporting and/or supported by the brake assembly, such as the wheel and/or an aircraft support strut, or an aircraft. The wheel and brake assembly is of inexpensive but sturdy construction and it would have an effective service life so that the objects of the invention would be achieved.

While a certain representative embodiment and details have been shown for the purpose of illustrating the invention, it will be apparent to those skilled in this art that various changes and modifications may be made therein without departing from the spirit or scope of the invention.

What is claimed is:

1. A brake characterized by its freedom from vibrations, which brake comprises housing means, rotatable wheel means, a brake disc having a plurality of key receiving slots in the periphery thereof, key means on said wheel means for securing said brake disc to said wheel means to permit axial movement of said brake disc on said wheel means, a plurality of braking units each comprising opposed brake lining shoes, said braking units being uniformly spaced circumferentially about the brake disc, and means carried by said housing means for forcing said brake lining shoes against said brake disc for braking action thereon, an odd number of said braking units being present, said brake disc having a number of key receiving slots therein greater than the number of said braking units in the brake but not evenly divisible by such number of braking units.

2. A brake characterized by its freedom from vibrations, said brake comprising a rotatable wheel, a brake disc having a plurality of slots equally spaced thereabout, a plurality of driving means on said wheel for engaging said slots to drive the disc while permitting axial movement of the disc, a plurality of braking units, means for supporting the braking units in equally spaced relation circumferentially of the disc, each braking unit having a shoe engageable with the disc, and means for advancing said shoes against the disc, there being an odd number greater than one of said braking units about the disc and the number of said slots in the disc being greater than the number of braking units and not evenly divisible by the number of braking units.

References Cited in the file of this patent
UNITED STATES PATENTS

| | | |
|---|---|---|
| 2,105,867 | Stewart | Jan. 18, 1938 |
| 2,115,083 | Pierce | Apr. 26, 1938 |
| 2,541,031 | Butler | Feb. 13, 1951 |
| 2,720,286 | Bricker | Oct. 11, 1955 |